Oct. 29, 1935.                J. R. ROBINSON                2,019,095
              PANEL JOINT AND METHOD OF MAKING THE SAME
                         Filed July 5, 1933

INVENTOR
John R. Robinson
BY
ATTORNEY

Patented Oct. 29, 1935

2,019,095

UNITED STATES PATENT OFFICE 2,019,095

PANEL JOINT AND METHOD OF MAKING THE SAME

John R. Robinson, Everett, Wash.

Application July 5, 1933, Serial No. 679,022

6 Claims. (Cl. 20—15)

My invention relates to a method of joining together panels, and apparatus for carrying out the same.

More particularly, my invention relates to the art of joining together panels, such as panels used to form walls, in such a manner that the joint between the panels is properly hidden, so that the same is not noticeable at the time the installation is completed.

Furthermore, my invention relates to the formation of a joint which provides means to maintain the joint not noticeable, despite the ordinary shrinkage and expansion obtaining in the panels.

The use of panels for the construction of walls has been restricted in practical use, because the joints could not be properly hidden. One attempt to hide the joint made use of trim over the joint. This use of trim over the joint, or the use of a batten, was very limited in utility and could be used only as in rooms where this specific construction blended or fit in with the general decoration of the room.

Another practice obtaining in the attempt to obtain a successful joint, resulted in the use of narrow strips of various materials, such as cloth or paper over the joint. After the application of this covering strip over the joint, it was necessary to apply a heavy plastic paint to hide the joining strips. This practice was characterized by the shortcoming that a natural grain finish was not possible, and furthermore that the shrinkage and expansion of the panels after installation caused a break in the covering strip or wrinkles therein. These breaks or wrinkles caused a disturbance of the plastic material over the joint and resulted in an unsightly appearance, and for practical purposes ruined the wall.

The plaster board art has used a plastic filler in the joints. This plastic material shrinks upon drying and a strip of metal or wire netting is superimposed over the joint, and then a heavy plastic paint is used as a final finishing for the wall. This type of paint is necessary to provide a sufficient body to hide the depth of the strips over the joints. The shortcomings of this type of a joint are very similar to those described in connection with the taped joint where a narrow strip of cloth, paper, or the like are used. This joint, however, is somewhat stronger, due to the filler between the joint and the metallic like strip on the surface.

Many lapped or beveled joints have been substituted in place of the previously described batten joints, but all of the joints found in the art have restricted the use of panels for wall construction to rooms having a certain set standard of decoration.

It is an object of my invention to overcome the objections obtaining in the joints heretofore used between panels in wall construction, and to obtain a joint which is characterized by providing a permanent smooth flush wall ready for any finish, whether the same be natural grained, stained, or covered with a plastic material.

The above mentioned general objects of my invention, together with others inherent in the same, are attained by the mechanism and product illustrated in the following drawing, the same being preferred exemplary forms of embodiment of my invention, throughout which drawing like reference numerals indicate like parts:

Figure 1:
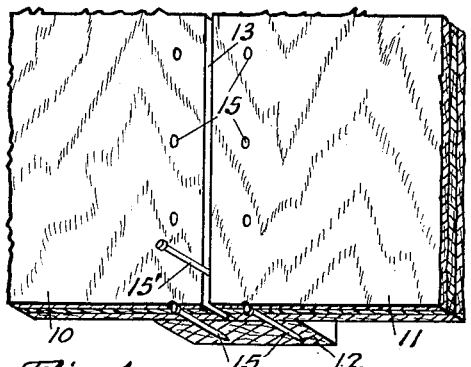
Figure 1 is a perspective view, with parts broken away, of the end portions of two panels secured to a supporting member and leaving the usual seam or joint between the ends of said panels.
Figure 2:
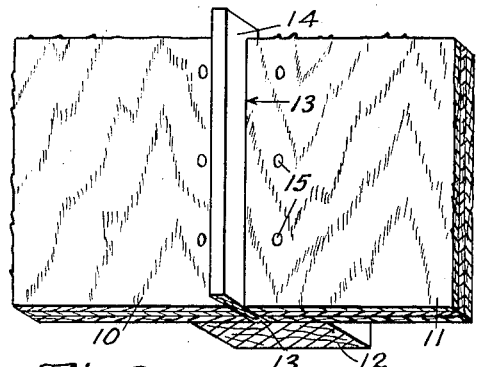
Fig. 2 is a perspective view of the parts shown in Figure 1 with the addition that the filler strip has been inserted into place.
Figure 3:
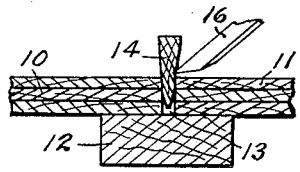
Fig. 3 is a fragmentary sectional view illustrating a manner of scoring the filler strip to produce a well defined cleavage line on said strip.
Figure 4:
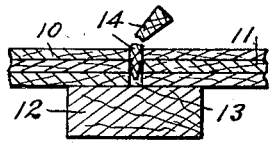
Fig. 4 is a fragmentary sectional view illustrating the manner of breaking off the excess portion of the filler strip along the cleavage line.
Figure 5:
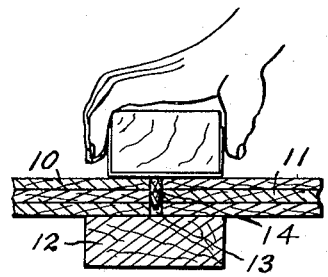
Fig. 5 is a fragmentary sectional view illustrating a manner of finishing the filler strip flush with the panel surfaces.
Figure 6:
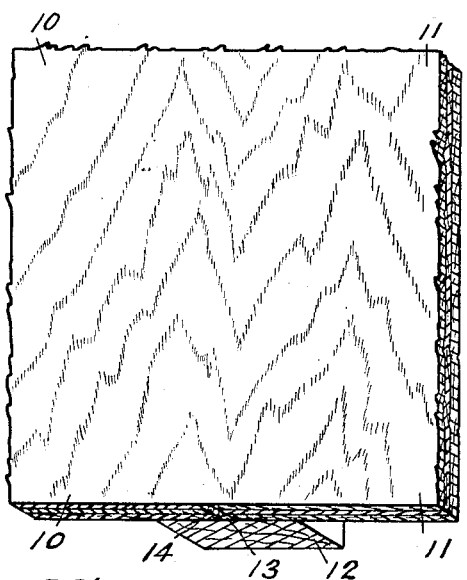
Fig. 6 is a perspective view of the parts shown in Fig. 2 with the addition that the filler strip has been cut down and finished to form an integral part of the surface portion of the wall.

In the construction of my device the edge portions of panels 10 and 11 are secured preferably by nailing to a studding 12 or similar supporting member. A seam or crack 13 is left between the panels at the time of installation. In actual practice I find that 1/16 of an inch between the panels is satisfactory spacing. One practical method of obtaining this spacing is to insert four penny finishing nails 15' as gauges between the edges of adjacent panels and then secure the panels to the supporting members 12. One of the wedge shaped fillers 14 is broken off of the block of filler strips shown in Fig. 7 and such filler strip is then slightly glued on both faces and inserted into the seam 13. Preferably the wedge shaped member 14 is driven into place so that it is under compression. The glue is then permitted to set, and then the wedge shaped member 14 is broken off slightly higher than the surface of the wall. This may be accomplished by scoring the wedge shaped member above the face of the panels as illustrated in Fig. 3, as by the use of a chisel 16 and then breaking off the extra part of the wedge shaped member 14 along this score or cleavage line as illustrated in Fig. 4. Thereafter finishing substances, such as fine sand paper, may be used to sand off and remove the remaining stub flush with the wall as illustrated in Fig. 5. This results in a smooth flush wall as illustrated in Fig. 6. Where a joint between adjacent panel members is formed of material similar to the material of the panels, this sameness of material presents no discrepancy between the material in the joint and the material in the panels adjacent thereto, and results in the appearance of a continuous panel.

As has been described, the wedge shaped member 14 is inserted into the seam or crack 13 under pressure. The member 14 will expand in use in the event that the panels 10 or 11 contract. In the event that the panels 10 and 11 expand it is to be noticed that the end portions of these panels are firmly secured to the supporting member 12 by a plurality of nails 15. The wedge shaped member 14 was secured in place by pressure and by gluing, therefore, considerable resistance is afforded to counteract the effect of the expansion of the panels on the joint. I have found in practice that the usual expansions obtaining are not sufficient to effect the joint, as my joint has a greater strength than the panels themselves in resisting expansion. In other words, in the event of contraction of the panels, the wedge shaped member 14, which is under compression, will expand to prevent any damage to the joints, and in the event of expansion of the panels, the movement caused by expansion will be spread uniformly over the panels and will not damage the joints, as the combined resistance against the pressure due to expansion afforded by the nails 15 and the filler members is greater than the resistance offered by the body portions of the panels.

After the nails or brads 15 are inserted into place, they may be countersunk and filled with putty according to the usual practice in the wood working art.

Figure 7:
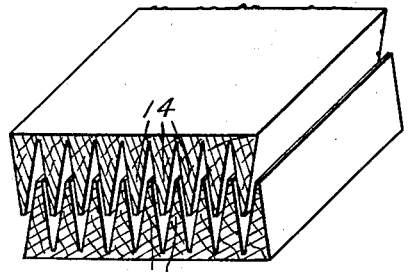
Fig. 7 is a view in perspective of the filler strips which are cut in sets for convenient handling and shipping.

In Fig. 7 I have shown a manner in which my wedge shaped member 14 may be cut in two units, so that the apexes of the wedge shaped members project in a comb like fashion. Two units of wedge shaped members will then interfit and can be readily shipped from place to place without damage. Furthermore, the said wedge shaped members 14 may be cut rapidly by ordinary lumber working machinery; and the cost of production of the same in this form is reduced to a minimum. To make one of these wedge shaped members available for use, it is only necessary to apply a slight pressure to break it off.

Although my joint has wide application in the art of building walls from panels, whether plaster board, compressed fibers, or wood, whether solid or veneered, is used, I have found that the same is of exceptional utility in making walls from wood veneer or plywood. Wood veneer is characterized by its extreme strength, and has gradually displaced the use of solid lumber in many fields. The use of such wood veneer panels in wall construction is highly desirable, but it has been extremely limited because of the lack of a satisfactory joint. My invention overcomes these problems and has in a large part already developed an entirely new use and new outlet for wooden veneer products.

Obviously, changes may be made in the forms, dimensions, and arrangement of the parts of my invention, without departing from the principle thereof, the above setting forth only preferred forms of embodiment.

I claim:

1. The method of joining together adjacent panels including the steps of securing the panels in place with an opening therebetween; gluing a wedge shaped filler member under compression in said opening; and smoothing off the filler member flush with the surface of the panels, whereby the effect of contraction and expansion on the joint between the adjacent panels is minimized.

2. The method of joining together adjacent panels including the steps of securing the panels in place with an opening of substantially $\tfrac{1}{16}$ of an inch therebetween; gluing a wedge shaped filler member under compression in said opening; and smoothing off the filler member flush with the surface of the panels.

3. The method of joining together adjacent plywood panels including the steps of securing the plywood panels in place with an opening of substantially $\tfrac{1}{16}$ of an inch therebetween; gluing a wooden wedge shaped filler member under compression in said opening; and smoothing off the filler member flush with the surface of the panels.

4. As an article of manufacture, a joint comprising a supporting member; panels secured to said supporting member with their adjacent end portions in close proximity; and a compressed wedge shaped filler member of a material similar to said panels glued in place between said adjacent end portions of the panels, the exposed surface of said filler member being substantially flush with the exposed surface of the said adjacent panel end portions, whereby the effect of contraction and expansion on the joint is minimized.

5. As an article of manufacture, a joint comprising a supporting member; panels secured to said supporting member with their adjacent end portions spaced apart approximately $\tfrac{1}{16}$th of an inch; and a compressed filler member of a material similar to said panels and substantially wedge shaped in cross section positioned between said adjacent end portions of the panels, the exposed surface of said filler member being substantially flush with the exposed surface of the said adjacent panel end portions, whereby a substantially continuous surface is provided.

6. As an article of manufacture, a wooden joint comprising a supporting member; plywood panels secured to said supporting member with their adjacent end portions spaced apart approximately $\tfrac{1}{16}$th of an inch; and a compressed wooden filler member of substantially wedge shape in cross section glued in place between said adjacent end portions of the panels, the exposed surface of said filler member being substantially flush with the exposed surface of the said adjacent panel end portions, whereby a substantially continuous surface is provided.

JOHN R. ROBINSON.